Patented Apr. 22, 1947

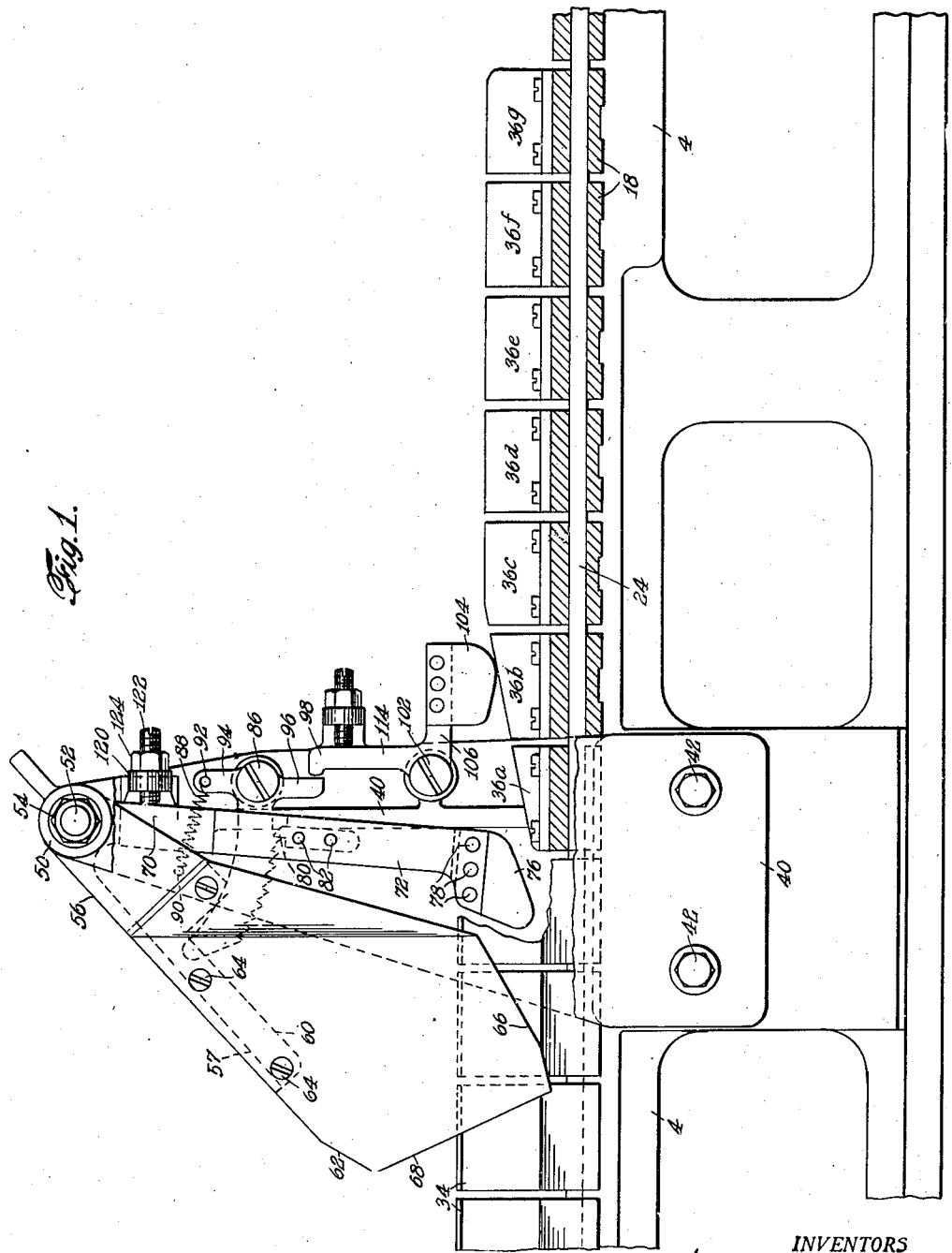

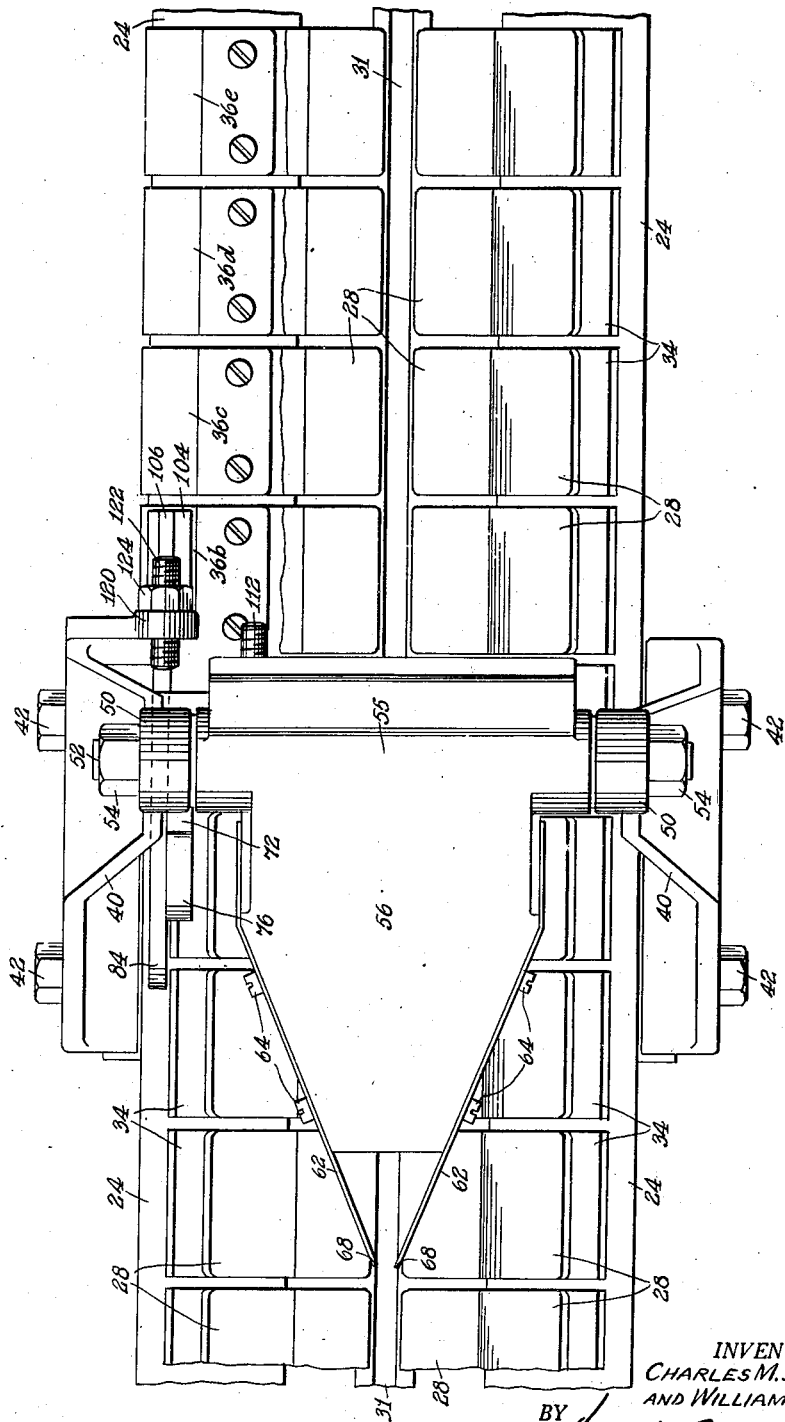

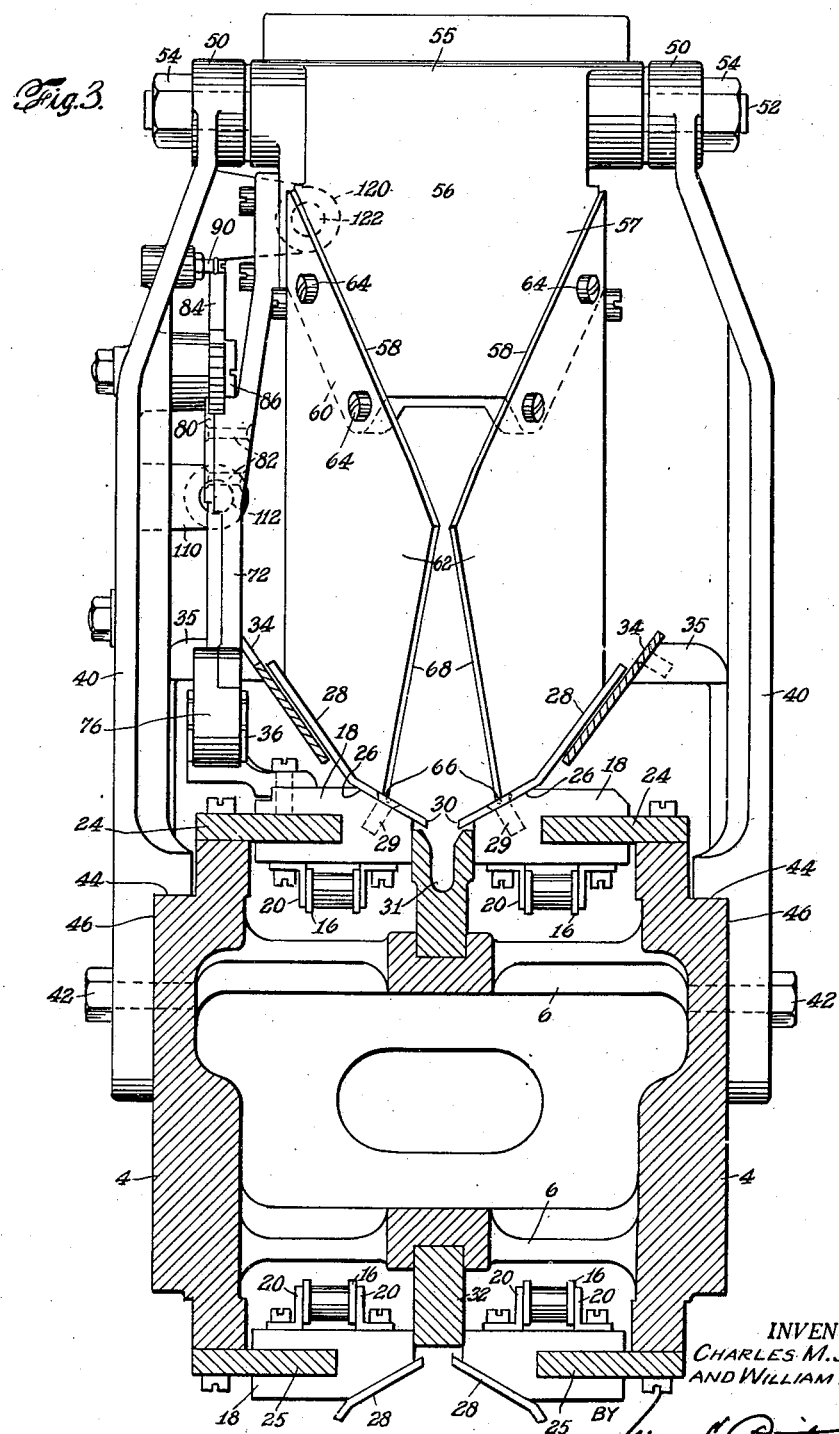

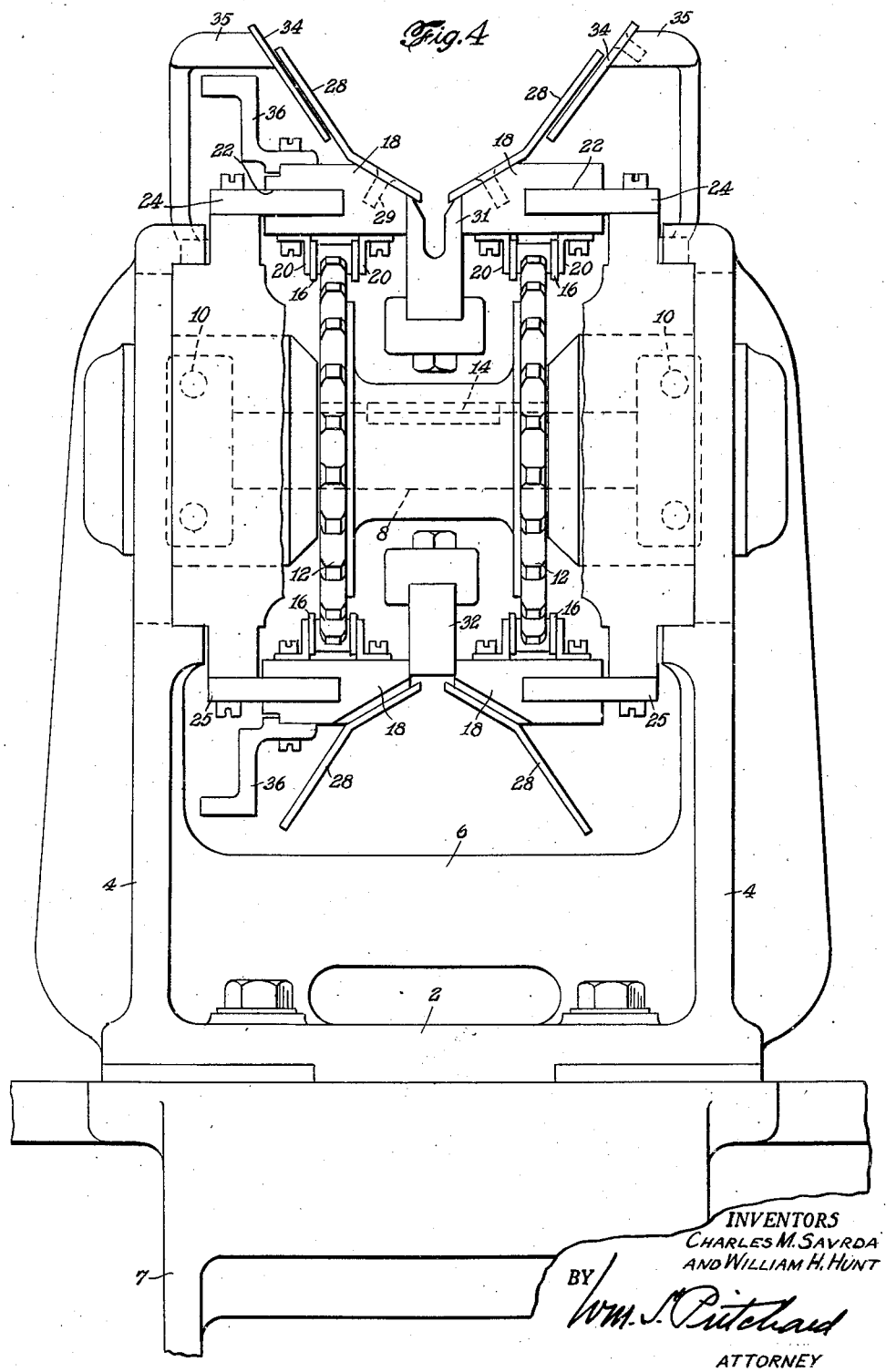

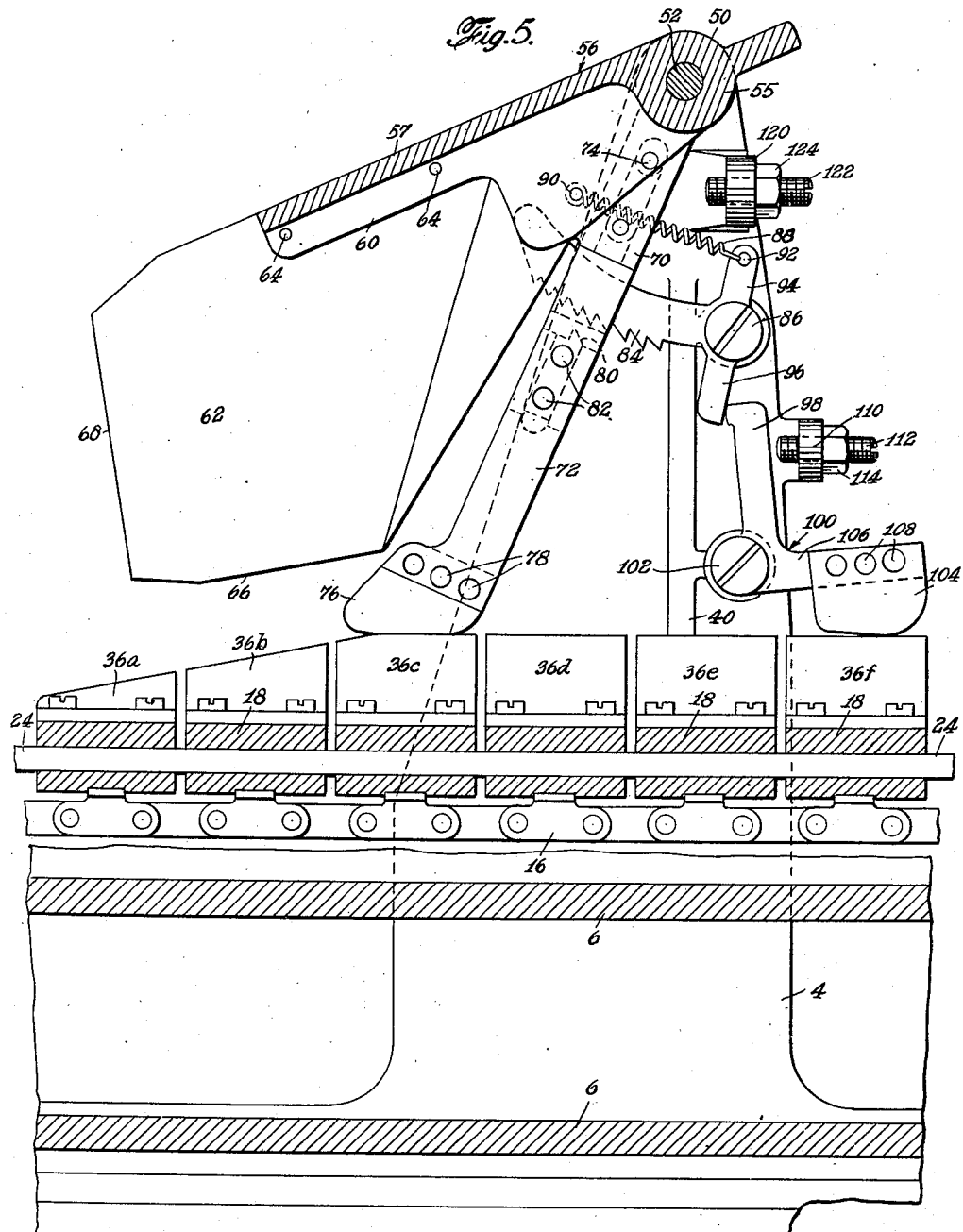

2,419,289

UNITED STATES PATENT OFFICE 2,419,289

CONVEYER APPARATUS FOR POSITIONING FISH

Charles M. Savrda, Bay Shore, N. Y., and William H. Hunt, National City, Calif., assignors to The Atlantic Coast Fisheries Company, New York, N. Y., a corporation of Maine Application May 20, 1944, Serial No. 536,506

14 Claims. (Cl. 198—34)

This invention relates to fish filleting machines, and more particularly to an apparatus for preliminarily positioning the fish.

An object of this invention is to provide a new and improved fish-positioning mechanism which will receive a fish fed thereto, tail leading and back downward, and hold it in such position for a predetermined period of time.

Another object of this invention is to provide in the path of a fish-feeding conveyer a gate which is provided with means which lock it in position to receive and retain a fish fed thereto by said feeding device.

A further object of this invention is to provide means whereby the locking means of the gate is released at predetermined times so that the fish is fed in proper position therefrom in timed relation to other parts of the filleting machine.

Other and additional objects will become apparent hereafter.

The above objects are accomplished, in general, by providing in the path of travel of a continuously moving flight conveyer which feeds a fish, tail leading and back downward, a gate which is adapted to receive a fish fed thereto by said flight conveyer. The gate is provided with means whereby it is locked into fish-receiving and retaining position and serves to properly position said fish. At predetermined times, the means which lock the gate are released whereby the gate is ineffective to retain the fish formerly held thereby and the flight conveyer feeds it to the next station. The means which actuate the locking means to ineffective position are positioned at spaced intervals along the length of the flight conveyer, the spacing and the rate of movement of the flight conveyer being such that the gate-locking mechanism will be released at predetermined times. In general, the gate is carried on a pivotally mounted bracket. The bracket is also provided with a lever which carries a shoe at the lower end thereof. Intermediate its ends, the lever is provided with a pawl which is adapted to cooperate with a ratchet lever pivotally mounted in the machine to lock the gate bracket against movement. The ratchet lever is provided with an arm which is in engagement with one arm of a pivoted bell-crank lever. The other arm of the bell-crank lever is provided with a shoe. The flight conveyer is provided with tripper means which, at predetermined intervals of time, engage the shoe on the bell-crank lever whereby the ratchet lever is elevated and released from locking engagement with the pawl. The shoe on the lever carrying the pawl also engages the trippers on the flight conveyer, whereby the arm is caused to rotate the bracket on its pivot. The rotation of the bracket causes the gate to be elevated and release the fish, which is then conveyed by the flight conveyer to the next station in the machine. Means are provided to adjust and limit the movements of the parts. Means are also provided to restore the pawl and ratchet to locking position.

The details of the invention will become clear from the accompanying drawings which illustrate a preferred embodiment of the invention and wherein:

Figure 1 is a side elevation showing the gate in position to hold and retain a fish just prior to the releasing of the locking means;

Figure 2 is a top plan view of the apparatus shown in Figure 1;

Figure 3 is an end view, partly in section, looking to the right in Figure 1;

Figure 4 is an end view, broken away, of the feed conveyer; and

Figure 5 is an enlarged central section showing the position of the parts when the gate-locking means has been released and the gate elevated.

Referring now to the drawings wherein like reference numerals designate like parts, the reference numeral 2 designates the base of a frame having side members 4 and cross members 6. The base 2 is secured to any suitable support, such as a frame 7. At the feed end of the apparatus there is provided a shaft 8 mounted in bearings 10 carried by the side members 4. A pair of sprockets 12 is secured, as by a key 14, to the shaft 8, and a pair of chains 16 extend in a substantially horizontal direction to a like pair of, and similarly mounted, sprockets (not shown). Either or both of the sprocket shafts may be driven by means (not shown).

Mounted on each pair of chains 16 and transversely aligned are a pair of blocks 18. Each block is secured by a pair of ears 20 to opposite sides of a link of the respective chains 16. Each block is provided with a channel 22 into which a rail 24 is positioned and over which the blocks travel during the upper flight of the chains 16. As shown in Figure 3, there are two rails 24, one on each side of the machine. Each rail 24 extends longitudinally of the machine adjacent the top flight of the chains 16 and is carried by the respective side members 4. During the lower flight of the chains 16, the blocks 18 pass over rails 25. As shown in Figure 3, there are also two rails 25, one on each side of the machine. Each of the rails 25 extends longitudinally of the machine adjacent the lower flight of the chains 16 and is carried by a respective side member 4.

Each of the blocks 18 is provided with an inclined top surface 26, so that each pair of opposed blocks form a downwardly converging passage. A plate block 28 is disposed on each of the inclined surfaces 26 and is secured to the respective blocks in any convenient manner, as by flat-headed screws 29. As shown in Figure 3, the portion of the plate block 28 extending beyond the inclined surface 26 of the block 18 is bent upwardly, whereby the passage between the opposed plate blocks 28 corresponds approximately to the shape of a fish. The lower edges 30 of the opposed plate blocks are in spaced relation with respect to each other and in close proximity to a fin guide 31 carried on the upper cross member 6. It is to be noted that the exterior walls of the fin guide 31 aid to maintain the blocks 18 on the rails 24 during their upper flight. A guide strip 32 carried by the lower cross member 6 serves to maintain the blocks 18 on the lower rails 25 during their lower flight.

The plate blocks 28 are also supported by an open trough 34, each side of which is secured to an arm 35 carried on the side member 4. The plate blocks 28, together with the chains 16, constitute a fish-feeding or conveying means.

For reasons which will become apparent, there is provided at spaced intervals along the plate conveyer a series of trippers 36 on one side of the machine. Each of the trippers 36 is secured to a block 18. In the form shown, each series of trippers 36 comprises six members 36a, 36b, 36c, 36d, 36e, 36f and 36g, the operative edges of which together form a cam surface, as will hereafter be explained.

To each of the side members 4, there is secured a standard 40 by means of screws 42. As shown in Figure 3, each standard 40 is provided with a shoulder 44 which rests on a flange 46 of the side member 4. Each of the standards 40 is formed at the upper end thereof with a bearing 50. A pivot shaft 52 extending transversely between the standards 40 is mounted in the bearings 50 and maintained in place by means of a nut 64 on each end. A journal 55 of a gate bracket 56 is pivotally mounted on the shaft 52. As shown in Figures 2 and 3, the gate bracket 56 has a plate 57 extending from and integral with the journal 55. The plate 57 has converging edges 58, each of which edges is formed with a downwardly extending flange or wing 60. Since the edges 58 are converging, the wings 60 formed integral therewith are also converging.

A gate member 62 is secured adjacent the top thereof to each wing 60 by screws 64. In the form shown, each gate member 62 is formed of an irregular shape. The bottom edge 66 of each gate member 62 is formed so that it will be of a shape complemenary to the shape of the plate blocks 28 and that in normal position, as shown in Figure 3, the bottom edge 66 will be in close proximity to such plate blocks 28, sufficient clearance being provided to permit the plate blocks 28 to pass therebeneath upon movement of the chains 16.

As shown in Figures 2 and 3, the gate members 62 converge forwardly to form a passage therebetween of a shape which approximates the shape of a fish, particularly as is assumed by a fish being fed tail leading and back downward. The forward edges 68 of the gate members terminate in spaced relationship to each other and in alignment with the fin guide 31. The space between the forward edges 68 is such as to permit the passage of the tail of a fish therethrough but insufficient to permit the passage therthrough of the portion of the fish adjacent the tail. When a fish is held by the gate, each plate thereof will engage the fish at the side opposite thereto.

The gate bracket 56 is provided with an arm 70, to which is adjustably secured a lever 72 by means of screws 74. A shoe 76 is secured to the lower end of the lever 72 in any appropriate manner, such as by rivets 78. The lever 72 is so positioned that the shoe 76 will engage the trippers 36 when they pass therebeneath. A pawl 80, secured to the lever 72 in any convenient manner, as by rivets 82, is adapted to cooperate with a ratchet lever 84, one end of which is pivotally mounted on a stud 86 carried in the upright 40, to lock the lever 72 and hence the gate bracket 56 from pivotal movement on the shaft 52. A spring 88, having one end secured to a pin 90 on the bracket 56 and the other end secured in an eye 92 of an arm 94 of the ratchet lever, maintains the pawl 80 in locking engagement with the ratchet lever 84. The ratchet lever 84 is also provided with a downwardly depending arm 96 which is adapted to cooperate with an arm 98 of a bell-crank lever 100 pivotally mounted on a stud 102 carried in the standard 40. A shoe 104, secured to the horizontal arm 106 of the bell-crank lever 100, is positioned to engage the trippers 36 when they pass therebeneath and whereby the arm 98 engages the arm 96 to rotate the ratchet lever 84 about the pivot 86 and disengage the pawl 80 from locking engagement with said ratchet lever 84.

An ear 110 carried by the upright 40 is provided with an adjustable stop screw 112 for adjusting the position of the shoe 104. A lock nut 114 secures the stop screw 112 in adjusted position.

An ear 120 carried by the upright 40 is provided with an adjustable stop screw 122 for positioning the bracket 56. A lock nut 124 serves to secure the stop screw 122 in adjusted position.

In operation, after the shoes 76 and 104 have been positioned as desired by the adjustment of the stop screws 122 and 112 respectively and the pawl 80 is in locking engagement with the ratchet lever 84, a fish, tail leading and back downward, is introduced at the delivery end of the machine onto the blocks 28 of the feeding conveyer. Due to the shape of the blocks 28, the fish is positioned with the fins extending in the fin guide 31. The fish is conveyed and, due to the location of the gates in the path of travel of the block conveyers, the fish passes between the gate members 62 until the tail thereof extends beyond the front edges 68 of the gate members 62. At this time, the fish is prevented by the gate from further movement while the feeding conveyer continues in its travel. The fish is held in this position until the locking means is disengaged and the gate bracket is elevated, releasing the fish and permitting the conveyer to conduct the fish to the next station in the machine.

The locking means is released by the tripper elements 36, as will now be explained. As is shown in Figures 1 and 4, the tripper elements are formed with surfaces which function as a cam. The tripper elements first engage the shoe 104 whereby the bell-crank lever 100 is moved about the pivot 102. The arm 98 of the bell-crank lever moves the arm 96 of the ratchet lever, and the ratchet lever rotates about the pivot 86 whereby the ratchet lever 84 is elevated and released from locking engagement with the pawl 80. While the shoe 104 is maintained by the tripper elements 36 in position to maintain the locking means ineffective, the shoe 76 also rides on the cam surfaces of the tripper elements 36 and causes the gate bracket 56 to rotate on the pivot shaft 52 and thereby elevate the gate. When the gate is elevated, the fish is released and the feeding conveyer feeds the fish to the next station. After the last tripper element 36 has passed from contact with the shoe 104 and the fish is being conveyed through the gate, the shoe 104 will return to its original position because of the action of the spring 88. However, the fish may maintain the gate in the elevated position. When the fish passes from the gate, the gate and the lever 72 will rotate on the shaft 52 because of gravity until the pawl 80 engages the original position of the ratchet lever.

By the positioning of the tripper elements at certain predetermined positions on the feeding conveyer, it is apparent that a fish may be fed to the gate and held there until it is released at a predetermined time. Usually, this time is such that the release of the fish is effected so that it can be conveyed to the next station in the machine at a predetermined time.

The apparatus herein described is particularly useful when used in conjunction with a fish filleting machine of the type shown in United States Patent 2,149,021, with or without the dorsal fin-removing mechanism shown in United States Patent 2,137,291.

The invention herein described provides an apparatus which permits the feeding of a fish at a predetermined time to a station in the machine where an operation may be performed thereon. The apparatus aids in the proper positioning of the fish even when the fish is temporarily not being fed and permits it to be fed in the proper position.

Since it is obvious that various changes and modifications may be made in the above description without departing from the nature or spirit thereof, this invention is not restricted thereto except as set forth in the appended claims.

We claim:

1. An apparatus which comprises a conveyer to feed a fish, tail leading and back downward, a gate including a pair of forwardly converging plates positioned in the path of travel of said fish and adapted to engage the fish at the sides thereof with the tail extending beyond said plates, means to lock said gate against movement whereby it will engage the fish fed thereto and prevent movement thereof, and means to render the locking means ineffective at a predetermined time whereby said conveyer will feed the fish.

2. An apparatus which comprises a conveyer to feed a fish, tail leading and back downward, a gate including a pair of forwardly converging plates positioned in the path of travel of said fish and adapted to engage the fish at the sides thereof with the tail extending beyond said plates, means to lock said gate against movement whereby it will engage the fish fed thereto and prevent movement thereof, and means at predetermined positions on said conveyer to actuate the locking means to ineffective position whereby said conveyer will feed the fish.

3. An apparatus which comprises a conveyer to feed a fish, tail leading and back downward, a gate including a pair of forwardly converging plates positioned in the path of travel of said fish and adapted to engage the fish at the sides thereof with the tail extending beyond said plates, means to lock said gate against movement whereby it will engage the fish fed thereto and prevent movement thereof, means at predetermined positions on said conveyer to actuate the locking means to ineffective position whereby said conveyer will feed the fish, and means to maintain the locking means ineffective until the fish has been fed away.

4. An apparatus which comprises a conveyer to feed a fish, tail leading and back downward, a pair of forwardly converging plates positioned in the path of travel of said fish and adapted to engage the fish at the sides thereof, a pivotally mounted bracket carrying said plates, means to lock said bracket against movement whereby the plates will engage the fish fed thereto and prevent movement thereof, means at predetermined positions on said conveyer to actuate the locking means to ineffective position whereby said conveyer will feed the fish, and means to maintain the locking means ineffective until the fish has been fed away.

5. An apparatus which comprises a conveyer to feed a fish, tail leading and back downward, a pair of forwardly converging plates positioned in the path of travel of said fish and adapted to engage the fish at the sides thereof, a pivotally mounted bracket carrying said plates, a pawl carried by said bracket, a ratchet lever normally in engagement with said pawl to lock said bracket against movement, means at predetermined positions on said conveyer to actuate said ratchet lever to disengage it from said pawl, and means to move said bracket to elevate the plates whereby said conveyer will feed the fish therefrom.

6. An apparatus which comprises a conveyer to feed a fish, tail leading and back downward, a pair of forwardly converging plates positioned in the path of travel of said fish and adapted to engage the fish at the sides thereof, a pivotally mounted bracket carrying said plates, a lever carred by said bracket, a shoe on said lever, a pawl carried by said lever, a pivoted ratchet lever normally in engagement with said pawl to lock said bracket against movement, a bell-crank lever having an arm in cooperative relationship with said ratchet lever, a shoe on the other arm of said bell-crank lever, and cam means at predetermined positions on said conveyer to engage the shoe of the bell-crank lever to actuate said ratchet lever to disengage it from said pawl and engage the shoe on the bracket lever to move said bracket whereby the plates will be elevated to permit said conveyer to feed the fish therefrom.

7. An apparatus as set forth in claim 6 having means to restore the pawl and ratchet lever into locking engagement after the cam means passes out of contact with the shoe of the bracket lever.

8. An apparatus as set forth in claim 6 wherein the cam means comprises a series of tripper blocks.

9. An apparatus which comprises a conveyer, means to drive said conveyer, fish-supporting means secured to said conveyer, said fish-supporting means including a plurality of pairs of oppositely disposed spaced plates between which a fish, tail leading and back downward, is positioned, a gate including a pair of pivotally mounted plates positioned intermediate said fish-supporting plates in the path of travel of said fish and adapted to engage the fish at both sides thereof, means to lock said gate against movement whereby it will engage the fish fed thereto and prevent movement thereof, means to render the locking means ineffective at a predetermined time, and means actuated by said conveyer after said locking means have been rendered ineffective to elevate said gate and release said fish whereby said conveyer will feed the fish.

10. An apparatus which comprises a conveyer, means to drive said conveyer, fish-supporting means secured to said conveyer, said fish-supporting means including a plurality of pairs of oppositely disposed spaced plates between which a fish, tail leading and back downward, is positioned, a gate including a pair of pivotally mounted plates positioned intermediate said fish-supporting plates in the path of travel of said fish and adapted to engage the fish at both sides thereof, means to lock said gate against movement whereby it will engage the fish fed thereto and prevent movement thereof, means at predetermined positions on said conveyer to arcuate the locking means to ineffective position, and means actuated by said conveyer after said locking means have been rendered ineffective to elevate said gate and release said fish whereby said conveyer will feed the fish.

11. An apparatus which comprises a conveyer, means to drive said conveyer, fish-supporting means secured to said conveyer, said fish-supporting means including a plurality of pairs of oppositely disposed spaced plates between which a fish, tail leading and back downward, is positioned, a gate including a pair of pivotally mounted plates positioned intermediate said fish-supporting plates in the path of travel of said fish and adapted to engage the fish at both sides thereof, means to lock said gate against movement whereby it will engage the fish fed thereto and prevent movement thereof, means at predetermined positions on said conveyer to actuate the locking means to ineffective position, and means actuated by said conveyer after said locking means have been rendered ineffective to elevate said gate and release said fish whereby said conveyer will feed the fish.

12. An apparatus which comprises a conveyer to feed a fish, tail leading and back downward, a pair of forwardly converging plates positioned in the path of travel of said fish and adapted to engage the fish at the sides thereof, a pivotally mounted bracket carrying said plates, means to lock said bracket against movement whereby the plates will engage the fish fed thereto and prevent movement thereof, means at predetermined positions on said conveyer to actuate the locking means to ineffective position, means to move said bracket to elevate said plates whereby said conveyer will feed the fish held thereby, and means to maintain the locking means ineffective until the fish has been fed away.

13. An apparatus which comprises a conveyer to feed a fish, tail leading and back downward, a pair of forwardly converging plates positioned in the path of travel of said fish and adapted to engage the fish at the sides thereof, a pivotally mounted bracket carrying said plates, means to lock said bracket against movement whereby the plates will engage the fish fed thereto and prevent movement thereof, means at predetermined positions on said conveyer to actuate the locking means to ineffective position, and means actuated by means on said conveyer, after the locking means has been rendered ineffective, to move said bracket to elevate said plates whereby said conveyer will feed the fish held thereby.

14. An apparatus which comprises a conveyer to feed a fish, tail leading and back downward, a pair of forwardly converging plates positioned in the path of travel of said fish and adapted to engage the fish at the sides thereof, a pivotally mounted bracket carrying said plates, a pawl carried by said bracket, a ratchet lever normally in engagement with said pawl to lock said bracket against movement, means at predetermined positions on said conveyer to actuate said ratchet lever to disengage it from said pawl, and means actuated by means on said conveyer, after the ratchet lever has been disengaged from the pawl, to move said bracket to elevate the plates whereby said conveyer will feed the fish therefrom.

CHARLES M. SAVRDA.
WILLIAM H. HUNT.

REFERENCES CITED

The following references are of record in the file of this patent:

UNITED STATES PATENTS

| Number | Name | Date |
|---|---|---|
| 1,343,417 | Steere | June 15, 1920 |
| 2,338,267 | Stewart et al. | Jan. 4, 1944 |
| 2,350,479 | Stewart | June 6, 1944 |
| 2,105,207 | Ullin | Jan. 11, 1938 |

Certificate of Correction

Patent No. 2,419,289.                                                                 April 22, 1947.

CHARLES M. SAVRDA ET AL.

It is hereby certified that errors appear in the printed specification of the above numbered patent requiring correction as follows: Column 3, line 49, for "nut 64" read *nut 54*; line 63, for "complemenary" read *complementary*; column 4, line 5, for "therthrough" read *therethrough*; column 6, line 46, for "carred" read *carried*; same line, after the word "lever" strike out the period and insert instead a comma; column 7, line 22, for "arcuate" read *actuate*; and that the said Letters Patent should be read with these corrections therein that the same may conform to the record of the case in the Patent Office.

Signed and sealed this 3rd day of June, A. D. 1947.

[SEAL]

LESLIE FRAZER,
*First Assistant Commissioner of Patents.*